United States Patent
Hsu et al.

(10) Patent No.: US 11,301,256 B2
(45) Date of Patent: Apr. 12, 2022

(54) SYSTEM AND METHOD FOR PAGE-CONSCIOUS GPU INSTRUCTION

(71) Applicant: Advanced Micro Devices, Inc., Sunnyvale, CA (US)

(72) Inventors: Lisa R. Hsu, Kirkland, WA (US); James Michael O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 766 days.

(21) Appl. No.: 14/466,080

(22) Filed: Aug. 22, 2014

(65) Prior Publication Data
US 2016/0055005 A1   Feb. 25, 2016

(51) Int. Cl.
*G06F 9/38* (2018.01)
*G06F 12/02* (2006.01)

(52) U.S. Cl.
CPC ............ *G06F 9/3887* (2013.01); *G06F 12/02* (2013.01)

(58) Field of Classification Search
CPC .. G06F 9/3887; G06F 9/4881; G06F 12/0862; G06F 12/10
See application file for complete search history.

(56) References Cited

U.S. PATENT DOCUMENTS

| | | | |
|---|---|---|---|
| 7,409,487 B1 * | 8/2008 | Chen | G06F 12/1036 711/6 |
| 7,558,939 B2 * | 7/2009 | Banerjee | G06F 12/1027 711/205 |
| 2004/0068730 A1 * | 4/2004 | Miller | G06F 9/485 718/106 |
| 2005/0108713 A1 * | 5/2005 | Geye | G06F 9/5033 718/100 |
| 2005/0108717 A1 * | 5/2005 | Hong | G06F 9/5033 718/102 |
| 2006/0179156 A1 * | 8/2006 | Eatherton | H04L 47/56 709/238 |
| 2006/0288346 A1 * | 12/2006 | Santos | G06F 9/4887 718/102 |
| 2009/0187915 A1 * | 7/2009 | Chew | G06F 9/5033 718/104 |
| 2010/0257538 A1 * | 10/2010 | Zhao | G06F 9/4881 718/106 |
| 2011/0035751 A1 * | 2/2011 | Krishnakumar | G06F 9/4881 718/103 |

(Continued)

OTHER PUBLICATIONS

Lee et al., "Many-Thread Aware Prefetching Mechanisms for GPGPU Applications," Dec. 2010, 43rd Annual IEEE/ACM International Symposium on Microarchitecture, pp. 213-224.*

(Continued)

*Primary Examiner* — Michael J Metzger
(74) *Attorney, Agent, or Firm* — Volpe Koenig

(57) ABSTRACT

Embodiments disclose a system and method for reducing virtual address translation latency in a wide execution engine that implements virtual memory. One example method describes a method comprising receiving a wavefront, classifying the wavefront into a subset based on classification criteria selected to reduce virtual address translation latency associated with a memory support structure, and scheduling the wavefront for processing based on the classifying.

17 Claims, 7 Drawing Sheets

(56) References Cited

U.S. PATENT DOCUMENTS

| | | | | |
|---|---|---|---|---|
| 2011/0088038 | A1* | 4/2011 | Kruglick | G06F 9/54 718/104 |
| 2012/0194525 | A1* | 8/2012 | Hartog | G06F 9/4881 345/503 |
| 2013/0145202 | A1* | 6/2013 | Hartog | G06F 12/1081 714/2 |
| 2013/0159680 | A1* | 6/2013 | Chen | G06F 9/30014 712/222 |
| 2013/0160019 | A1* | 6/2013 | Hartog | G06F 9/4843 718/104 |
| 2013/0166881 | A1* | 6/2013 | Choquette | G06F 9/3851 712/206 |
| 2013/0262816 | A1* | 10/2013 | Ronen | G06F 12/1027 711/207 |
| 2013/0297919 | A1* | 11/2013 | Kang | G06F 9/30 712/241 |
| 2014/0108766 | A1* | 4/2014 | Desai | G06F 12/1027 711/205 |
| 2014/0123145 | A1* | 5/2014 | Barrow-Williams | G06F 12/109 718/102 |
| 2014/0149677 | A1* | 5/2014 | Jayasena | G06F 12/0862 711/137 |
| 2015/0355996 | A1* | 12/2015 | Smith | G06F 9/461 717/128 |

OTHER PUBLICATIONS

Pichai et al., "Architectural Support for Address Translation on GPUs: Designing Memory Management Units for CPU/GPUs with Unified Address Spaces." Proceedings of the 19th international conference on Architectural support for programming languages and operating systems, Mar. 2014, pp. 743-758.*

Meng et al., "Dynamic Warp Subdivision for Integrated Branch and Memory Divergence Tolerance," Jun. 2010, Proceedings of the 37th annual international symposium on Computer architecture, pp. 235-246.*

Jog et al., "Orchestrated Scheduling and Prefetching for GPGPUs," Jun. 2013, Proceedings of the 40th Annual International Symposium on Computer Architecture, pp. 332-343.*

Mark Gebhart et al., Energy-efficient Mechanisms for Managing Thread Context in Throughput Processors, 2011, pp. 235-246, ISCA'11, San Jose, CA.

Timothy G. Rogers et al., Cache-Conscious Wavefront Scheduling, 2012 IEEE/ACM $45^{th}$ Annual International Symposium on Microarchitecture, 2012, pp. 72-83, IEEE Computer Society, British Columbia.

M. Gebhart, et al. "Energy Efficient Mechanisms for Managing Thread Context in Throughput Processors." In the Proceedings of the 38th International Symposium on Computer Architecture, San Jose, California, Jun. 4-8, 2011. http://www.cs.virginia.edu/~skadron/Papers/gebhart_isca11.pdf.

T.G. Rogers, et al. "Cache-conscious Wavefront Scheduling." In Proceedings of the 45th IEEE/ACM International Symposium on Microarchitecture, pp. 72-83, Vancouver, British Columbia, Dec. 1-5, 2012. https://www.ece.ubc.ca/~tgrogers/publications.html.

B. Pichai, et al. "Architectural Support for Address Translation on GPUs: Designing Memory Management Units for CPU/GPUs with Unified Address Spaces." In the Proceedings of the 19th International Conference on Architectural Support for Programming Languages and Operating Systems, Mar. 1-5, 2014, Salt Lake City, Utah. http://www.cs.rutgers.edu/~abhib/bpichai-asplos14.pdf.

* cited by examiner

SYSTEM AND METHOD FOR PAGE-CONSCIOUS GPU INSTRUCTION

BACKGROUND

Technical Field

Embodiments of the disclosure generally relate to a system and method for reducing virtual address translation latency in a wide execution engine that implements virtual memory.

Background

A processor that can perform single instruction, multiple data (SIMD) instructions—such as a graphics processing unit (GPU), vector processor, co-processor, and the like—may perform memory operations (e.g., load and store instructions) on up to N different memory addresses, where N is the width of the processor. In processors that employ virtual memory as a memory management technique, the N different memory addresses relate to virtual memory addresses that must translated into up to N physical memory addresses in order to perform the memory operation. Translation is often supported by an intermediate structure, such as a page table cache, a translation lookaside buffer (TLB), or the like.

Address translation in a processor that can perform SIMD instructions can put significant pressure on the memory system for at least two reasons. First, a single instruction may require up to N different translations, which can delay the progress or retirement of that instruction if a single translation of the N different translations requires a long latency translation—e.g., in the case of a "miss" to the intermediate structure. Second, within a given number of instructions, e.g., M instructions, it is possible that there must be N*M different address translations. Here, the temporal locality of pages can be difficult to capture within the intermediate structure unless the intermediate structure is very large, which may not be desirable.

SUMMARY OF EXAMPLE EMBODIMENTS

Embodiments disclose a system and method for reducing virtual address translation latency in a wide execution engine that implements virtual memory. One embodiment describes a system comprising a wavefront classifier configured to classify a wavefront into a subset based on classification criteria selected to reduce virtual address translation latency associated with a memory support structure; and a wavefront scheduler configured to schedule the wavefront for processing by a plurality of processing lanes based on the classification.

The subset maybe selected from a plurality of subsets comprising an active subset and a pending subset, and the wavefront scheduler may be further configured to schedule the active subset for processing before scheduling the pending subset for processing. The plurality of subsets may further comprises a pre-fetch subset, and the wavefront scheduler may be further configured to schedule the pre-fetch subset for processing after scheduling the active subset for processing and before scheduling the pending subset for processing.

Another embodiment describes a method comprising receiving, at a single instruction, multiple data (SIMD) processing unit, a wavefront; classifying the wavefront into a subset based on classification criteria selected to reduce virtual address translation latency associated with a memory support structure; and scheduling the wavefront for processing by the SIMD processing unit based on the classifying.

Yet another embodiment describes a computer readable storage device having computer readable instructions stored thereon, execution of which, by a computing device, causes the computing device to perform operations comprising: receiving a wavefront; and classifying the wavefront into a subset based on classification criteria selected to reduce virtual address translation latency associated with a memory support structure; and scheduling the wavefront for processing based on the classifying.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EXAMPLE EMBODIMENTS

Figure 1:
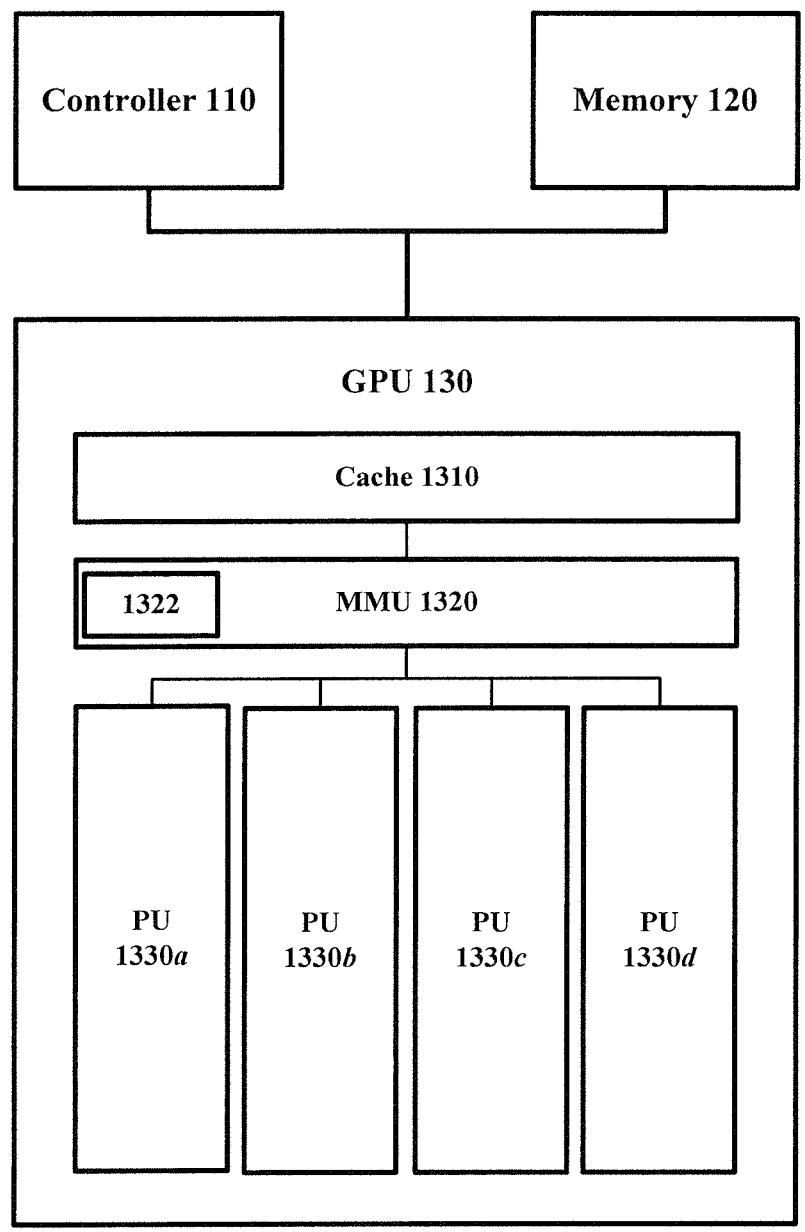
FIG. 1 illustrates an example system for reducing address translation latency in a wide execution engine that implements virtual memory.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an," and "the" are intended to include the plural forms as well, unless the context clearly indicates otherwise. It will be further understood that the terms "comprises," "comprising," "includes," and "including," when used herein, specify the presence of stated features, integers, steps, operations, elements, and components, but do not preclude the presence or addition of one or more other features, integers, steps, operations, elements, components, or groups thereof.

Electronic devices process data and provide thousands of applications to users. Example electronic devices include, but are not limited to, mobile phones, personal computers, workstations, and game consoles. Electronic devices use a central processing unit (CPU) to process data. A CPU is a processor which carries out instructions of computer programs or applications. For example, a CPU carries out instructions by performing arithmetical, logical and input/output operations of the computer programs or applications. In an embodiment, the CPU performs sequential processing, that may include control instructions that include decision making code of a computer program or an application, and delegates processing to other processors in the electronic device, such as a graphics processing unit (GPU).

A GPU is a processor that is a specialized electronic circuit designed to rapidly process mathematically intensive applications on electronic devices. The GPU has a highly parallel structure that is efficient for processing of large blocks of data in parallel, such as mathematically intensive data of the computer graphics applications, images and videos. The GPU may receive data for processing from a CPU or generate data for processing from previously processed data and operations. In an embodiment, the GPU is a hardware-based processor that uses hardware to process data in parallel.

FIG. 1 illustrates an example system 100 for reducing address translation latency in a processor that can perform SIMD instructions. The system 100 includes a controller 110, system memory 120, and a GPU 130. In the example system 100, the controller 110, the system memory 120, and the GPU 130 are communicatively coupled—which may include one or more physical, wired connection(s), one or more wireless connection(s), or a combination of physical, wired connections and wireless connections.

Some or all of the components shown in FIG. 1 may be implemented as a single integrated circuit, or as separate integrated circuits. When implemented as separate integrated circuits, the separate circuits may be mounted on a mother board, a printed circuit board (PCB), or the like. In one non-limiting example, the controller 110 and the GPU 130 are implemented as first integrated circuit, but the system memory 120 is integrated as a second integrated circuit that is communicatively coupled to the first integrated circuit. In a second non-limiting example, the controller 110, the system memory 120, and the GPU 130 are implemented as separate integrated circuits that are communicatively coupled. Other configurations apparent to a person skilled in the art are within the scope of this disclosure.

Also, a person skilled in the art would understand that the system 100 may include one or more components (e.g., implemented in hardware, software, or any combination of hardware and software) in addition to the components shown in the embodiment of FIG. 1 without departing from the scope of this disclosure. Software described throughout this disclosure may be embodied as one or more computer-readable instruction(s) on a computer-readable storage device—such as a persistent memory device (e.g., read-only memory (ROM), flash memory, a magnetic storage device, an optical disc, and the like), a non-persistent memory device (e.g., random-access memory (RAM)), and the like—that can be executed by a processor to perform one or more operations.

In the example embodiment of FIG. 1, the controller 110 controls the overall operation of the system 100. The controller 110 may include one or more processors. Examples of the controller 110 include, but are not limited to, one or more: CPUs, field programmable gate arrays (FPGA), application specific integrated circuits (ASIC), digital signal processors (DSP), and the like.

The system memory 120 of FIG. 1 may include one or more computer-readable storage devices, and may include persistent memory (e.g., read-only memory (ROM), flash memory, a magnetic storage device, an optical disc, and the like), non-persistent memory (e.g., random-access memory (RAM)), or a combination of persistent memory and non-persistent memory. The system memory 120 may also include, or be associated with, one or more memory controllers that control access to the system memory 120. Any type of data, instruction, or the like can be stored in the system memory 120. The system memory 120 may store computer-readable instructions that can be executed by the controller 110 to control the overall operation of the system 100. Likewise, the system memory 120 may store computer-readable instructions that can be executed by the GPU 130 to perform methods or operations described in accordance with this disclosure—such as the example methods illustrated in FIG. 4 and FIG. 6.

The GPU 130 of FIG. 1 is a wide execution engine that can perform SIMD instructions. While depicted as a graphics processing unit in FIG. 1, component 130 may be any wide execution engine that can perform SIMD instructions, including, but not limited to, one or more: GPU(s), general-purpose GPU(s) (GPGPU), vector processor(s), co-processor(s), accelerated processing unit(s) (APU), and the like. In the system 100 of FIG. 1, the controller 110 may off-load certain processes to the GPU 130 to employ the parallel-compute functionality of the GPU 130.

Figure 2:
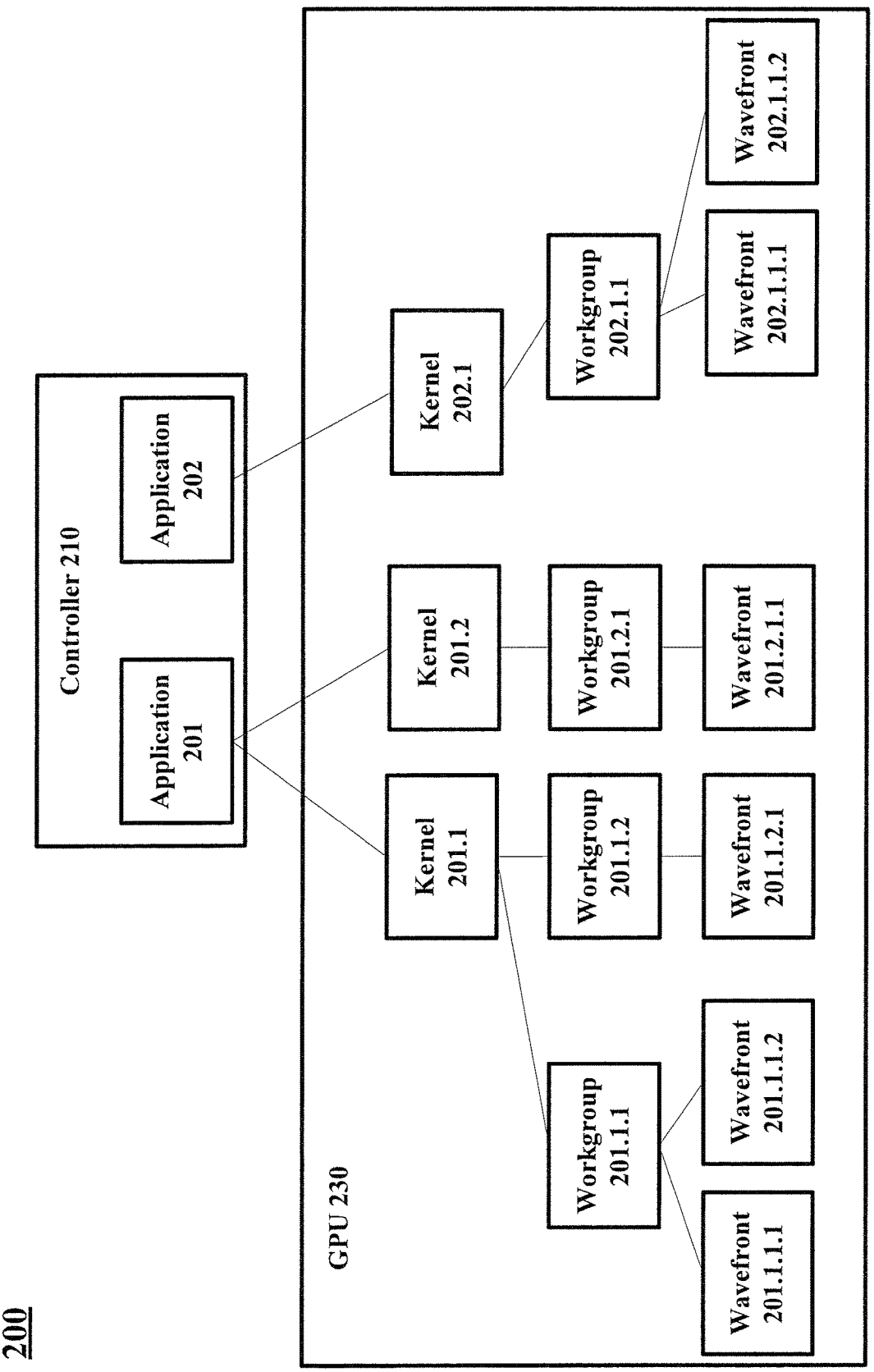
FIG. 2 illustrates an example processing environment.

Turning briefly to FIG. 2, an example processing environment 200 is illustrated. In FIG. 2, a controller 210 (which may be the same as or different than the controller 110 of FIG. 1) executes applications 201 and 202, each of which launch one or more kernels for processing by the GPU 230 (which may be the same as or different than the GPU 130 of FIG. 1). In this example, the application 201 launches kernels 201.1 and 201.2, and the application 202 launches the kernel 202.1. Here, a kernel includes work items or threads that can be processed by the GPU 230. A group of threads that is processed concurrently (e.g., through the processing lanes of an SIMD processing unit—further discussed in accordance with FIGS. 3 and 4) may be referred to as a "wavefront," a "warp," or an "instruction stream."

The threads of a kernel in FIG. 2 may be grouped into one or more workgroups, and each workgroup may include one or more wavefronts. In the example illustrated in FIG. 2, each wavefront is associated with a workgroup, a kernel, and an application—e.g., the wavefronts 201.1.1.1 and 201.1.1.2 are associated the workgroup 201.1.1, the kernel 201.1, and the application 201; the wavefront 201.1.2.1 is associated with the workgroup 201.1.2, the kernel 201.1, and the application 201; and so on. Each application, each kernel, and each workgroup may have an identifier associated therewith, and each wavefront may include or be associated with the identifiers of the application, kernel, and workgroup it is associated with.

The example applications 201 and 202 executing on the controller 210 may implement OpenCL, CUDA, Renderscript, or any other framework to employ the processing functionality of the GPU 230. A person skilled in the art would understand that FIG. 2 is merely an example, and a controller may execute any number of applications, an application my launch any number of kernels, a kernel may launch any number of workgroups, a workgroup may include any number of wavefronts, a wavefront may include any number of threads, and a processing unit may receive and process any number of wavefronts.

Returning to FIG. 1, the GPU 130 includes a cache 1310, a memory management unit (MMU) 1320, and processing units 1330a-1330d. The cache 1310 is communicatively coupled to the MMU 1320, and the MMU 1320 is communicatively coupled to each of the processing units 1330a-1330d. In other embodiments, the cache 1310 is communicatively coupled to the MMU 1320 and each of the processing units 1330a-1330d. And, while depicted as separate elements in FIG. 1, some or all functions of the cache 1310 may be achieved by the MMU 1320, or vice versa, in some embodiments. The cache 1310 is memory that is local to the GPU 130, and may be used to store any type of data, instruction, or the like. A person skilled in the art would understand that the GPU 130 may include one or more components (e.g., implemented in hardware, software, or any combination of hardware and software) in addition to the components shown in the embodiment of FIG. 1 without departing from the scope of this disclosure.

The system 100 of FIG. 1 employs virtual memory as a memory management technique. As such, the MMU 1320 includes hardware, software, or a combination of hardware and software to perform virtual memory address to physical memory address translation for memory page access for, at least, the GPU 130. In some embodiments, the MMU 1320 (including the memory 1322) is associated with one or more memory controllers that control access to the system memory 120, and can perform virtual memory address to physical memory address translation for the controller 110, the GPU 130, and any other components accessing the system memory 120.

As depicted in FIG. 1, the MMU 1320 includes a memory 1322 that can store a mapping of virtual memory addresses to physical memory addresses. Examples of the memory 1322 include, but are not limited to, a page cache and a TLB. In some embodiments, the memory 1322 is content-addressable memory (CAM). The memory 1322 can be employed by the MMU 1320 to accelerate translations from the virtual memory space to the physical memory space. The memory 1322 may be considered a memory support structure, which, in some embodiments, may reside in the system memory 120 or cache 1310. In some embodiments, the GPU 130 or the MMU 1320 may include coalescing hardware that determines that N addresses for a given load or store correspond to $N_C$ unique cache line addresses (where $N_C<=N$), e.g., of cache 1310. The coalescing hardware may further determine that the $N_C$ cache lines represent $N_P$ unique pages (where $N_P<=N_C$).

The GPU 130 of FIG. 1 also includes processing units 1330a-1330d, which may be referred to as SIMD processing units. While four processing units are shown in FIG. 1, the GPU 130 may include any number of processing units (e.g., tens, hundreds, thousands, etc.). Each of the processing units 1330a-1330d include hardware, software, or a combination of hardware and software to process wavefronts in a manner that may improve the efficiency of address translation by the MMU 1320. In example embodiments, this may be achieved by grouping or classifying a set of wavefronts to be processed into subsets based on criteria (e.g., classification criteria). The criteria may be selected to minimize or eliminate "misses" in the memory 1322 (i.e., minimize the number of times a requested address is searched for but not found in the memory 1322) when the subset is processed. Because a miss can result in a page walk, which is an expensive process in terms of the duration of time required to identify and return the requested address, minimizing the number of misses in the memory 1322 may reduce the overall translation latency associated with the MMU 1320.

Figure 3:
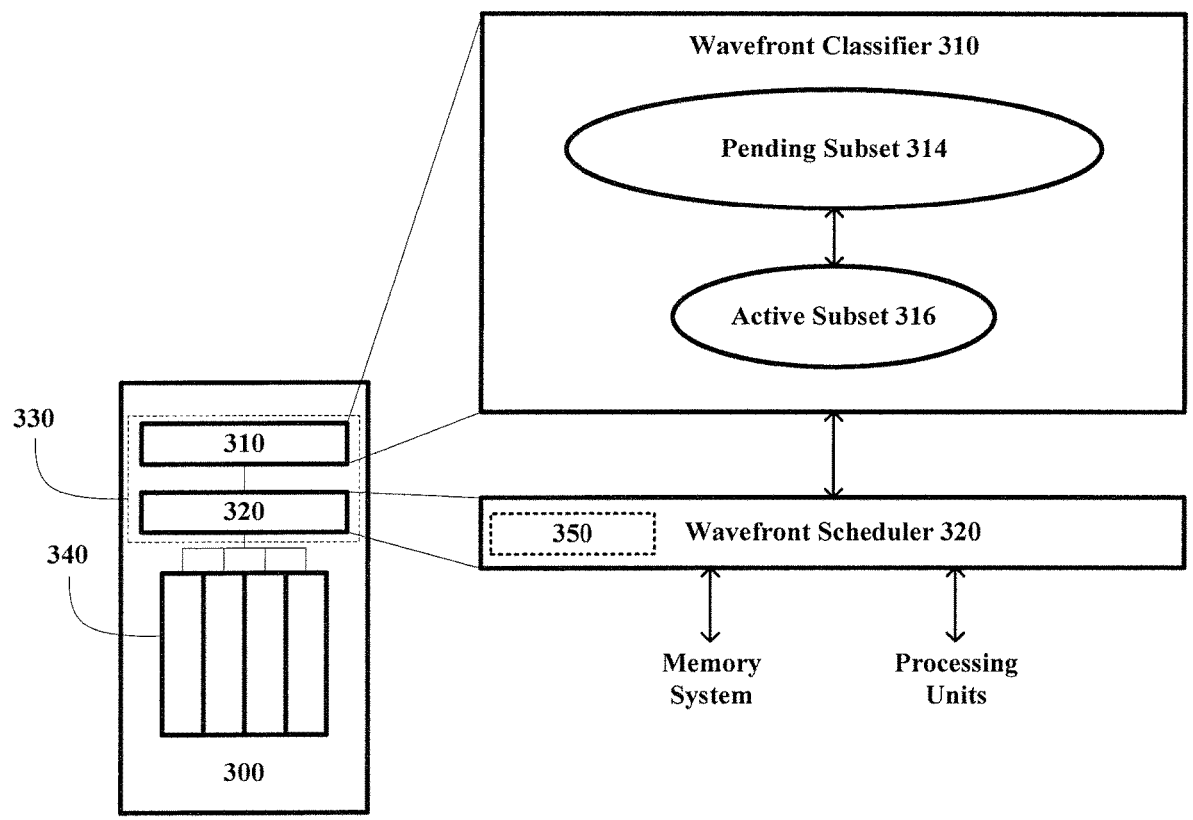
FIG. 3 illustrates an example processing unit that can classify a set of wavefronts into two subsets.

FIG. 3 illustrates an example processing unit 300 that can classify a set of wavefronts into two subsets. Each of the processing units 1330a-1330d of FIG. 1 may be the same as or different than the processing unit 300 of FIG. 3. The processing unit 300 includes a wavefront classifier 310, a wavefront scheduler 320, and a plurality of processing lanes 340. While the processing unit 300 of FIG. 3 is depicted with four processing lanes 340, any number of processing lanes (e.g., tens, hundreds, thousands, etc.) may be included in the processing unit 300. A person skilled in the art would understand that the processing unit 300 may include one or more components (e.g., implemented in hardware, software, or any combination of hardware and software) in addition to the components shown in the embodiment of FIG. 3 without departing from the scope of this disclosure.

The wavefront classifier 310 and the wavefront scheduler 320 may be implemented as separate components or as a single component (depicted as component 330 in FIG. 3), and may be implemented in hardware, software, or any combination of hardware and software. The wavefront classifier 310 is communicatively coupled to the wavefront scheduler 320, which is communicatively coupled to each of the processing lanes 340. The wavefront scheduler 320 is also communicatively coupled to a memory system, which may include a memory management unit (e.g., MMU 1320 of FIG. 1), local memory (e.g., cache 1310 of FIG. 1), system memory (e.g., system memory 120 of FIG. 1), and the like.

The wavefront classifier 310 may classify a set of wavefronts into subsets based on classification criteria. The maximum size of a subset, i.e., the maximum number of waterfronts that may be assigned to a subset, may be limited or unlimited. Any two subsets may be the same size or different sizes.

In FIG. 3, the wavefront classifier 310 classifies a set of wavefronts received by the processing unit 300 into two subsets—a pending subset 314 and an active subset 316. Wavefronts in the active subset 316 are eligible to be scheduled (by the scheduler 320), and processed (by the processing lanes 340); wavefronts assigned to the pending subset are generally ineligible for scheduling and processing. However, one or more wavefronts assigned to the pending subset 314 may become eligible if all of the wavefronts assigned to the active subset 316 become stalled, e.g., have outstanding address translation operations. In this case, selection of the one or more wavefronts assigned to the pending subset 314 that become eligible may be based on the classification criteria, or may be random. In some embodiments, wavefronts in the pending subset 314 are prevented from issuing memory instructions.

In the example embodiment of FIG. 3, a wavefront assigned to the pending subset 314 may be promoted (i.e., reassigned) to the active subset 316 when a wavefront from the active subset 316 completes processing. Again, selection of the wavefront assigned to the pending subset 314 to be promoted may be based on the classification criteria, or may be random. The maximum number of wavefronts that may be assigned to the active subset 316 may be less than, equal to, or greater than the number of wavefronts that may be assigned to the pending subset 314. In the embodiment of FIG. 3, any wavefront at the processing unit 300 that is not assigned to the active subset 316 is assigned to the pending subset 314.

The wavefront scheduler 320 schedules wavefronts for processing through the processing lanes 340, and generally seeks to maximize the processing efficiency of the processing unit 300 by keeping the processing lanes 340 active—e.g., minimizing inactivity of the processing lanes 340 due to address translation latency associated with memory operations. In FIG. 3, the wavefront scheduler 320 schedules wavefronts in the active subset 316 for processing through the processing lanes 340, which process the wavefronts received from the wavefront scheduler 320. The processing lanes 340 can process threads in parallel. Here, a group of threads that is processed in parallel through the processing lanes 340 is referred to as a wavefront.

The classification criteria implemented by the wavefront classifier 310 to assign a wavefront to a subset may be based on an identifier associated with the wavefront—such as one or more of the identifiers described in accordance with FIG. 2. In one embodiment, a wavefront is assigned based on its workgroup identifier. For example, the wavefront classifier 310 may assign wavefronts of the workgroup 201.1.1 of FIG. 2 to the active subset 316, while all other wavefronts are assigned to the pending subset 314. As another example, the wavefront classifier 310 may assign wavefronts of the workgroups 201.1.2 and 201.2.1 to the active subset 316, while all other wavefronts are assigned to the pending subset 314.

In another embodiment, a wavefront is classified based on its kernel identifier. For example, the wavefront classifier 310 may assign wavefronts of the kernel 201.1 of FIG. 2 to the active subset 316, while all other wavefronts are assigned to the pending subset 314. As another example, the wavefront classifier 310 may assign wavefronts of the kernels 201.2 and 202.1 to the active subset 316, while all other wavefronts are assigned to the pending subset 314. In yet another embodiment, a wavefront is classified based on its application identifier. For example, the wavefront classifier 310 may assign wavefronts of the application 201 of FIG. 2 to the active subset 316, while all other wavefronts are assigned to the pending subset 314.

In these embodiments, wavefronts of the same application, kernel, or workgroup may be grouped together for processing. While not always the case, these embodiments rely on an assumption that wavefronts from the same application, kernel, or workgroup are more likely to access the same memory pages than wavefronts of other applications, kernels, or workgroups. In other words, these embodiments presume wavefronts from the same application, kernel, or workgroup have a higher page-usage affinity than wavefronts from different other applications, kernels, or workgroups.

Additionally or alternatively, the classification criteria used to assign a wavefront to a subset may be based on information indicating memory page-usage affinity among the wavefronts of a set of wavefronts. The information may be based on real-time monitoring or software-based hints. In one embodiment, a hardware structure tracks memory page sharing among wavefronts to identify the wavefronts with the highest page-usage affinity. In another embodiment, software monitors the amount of page sharing among wavefronts to identify the wavefronts with the highest page-usage affinity. In another embodiment, software-based hints (e.g., from a compiler, written into the software by the software's developer, etc.) indicate the wavefronts with the highest page-usage affinity. Using these techniques, wavefronts with the highest degree of page sharing can be assigned to the same subset. As should be apparent to a person of skill in the art, two or more of these techniques may be used in combination to monitor page-usage affinity among the wavefronts of a set of wavefronts.

In FIG. 3, an information mechanism 350 provides the information indicating memory page-usage affinity to the wavefront scheduler 320. Here, the information mechanism 350, the wavefront scheduler 320, or the wavefront classifier 310 may identify the wavefronts with the highest page-usage affinity based on the information gathered by the information mechanism 350. In some embodiments, the information mechanism 350 may be considered a feedback mechanism, feeding real-time page-usage information to the wavefront scheduler 320 or the wavefront classifier 310. While the information mechanism 350 is a part of the wavefront scheduler 320 in FIG. 3, it is not limited thereto. For example, it may a part of the wavefront classifier 310, or it may be separate logic, structure, application, process, routine, etc. that is communicatively coupled to the wavefront classifier 310, the wavefront scheduler 320, or any other component of the processing unit 300.

Figure 4:
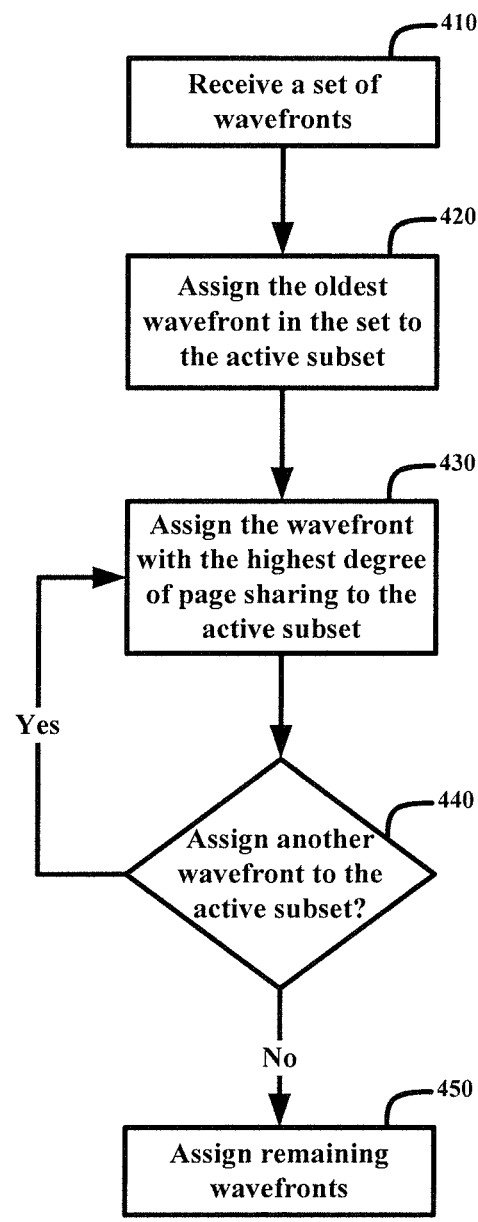
FIG. 4 illustrates an example method for classifying a set of wavefronts into subsets.

Turning now to FIG. 4, an example method 400 of classifying wavefronts into subsets based on information indicating memory page-usage affinity among the wavefronts is shown. The method 400 of FIG. 4 may be implemented by the processing unit 300 of FIG. 3, which may be included in the GPU 130 of FIG. 1; or the processing unit 500 of FIG. 5 (discussed below), which may be included in the GPU 130 of FIG. 1; or any other processor. Also, each stage of the method 400 may represent a computer-readable instruction stored on a computer-readable storage device, which, when executed by a processor causes the processor to perform one or more operations.

The method 400 begins at stage 410, where a processing unit (e.g., the processing unit 300 of FIG. 3) receives a set of wavefronts for processing. In stage 420, the oldest wavefront, i.e., the wavefront that has waited the longest amount of time to be processed, is identified and assigned to the active subset. Here, each wavefront in the set may include information, such as meta-data, indicating its age. For example, each wavefront may include a timestamp indicating its inception, which may be used to compute its age. Stage 420 may be implemented by the wavefront classifier 310.

The method 400 then proceeds to stage 430, where the remaining wavefronts in the set are evaluated in order to identify the wavefront having the highest degree of page-sharing with the wavefront that was assigned to the active subset in stage 420. Page-usage affinity among wavefronts may be determined using any of the techniques described above. In the event of a tie, e.g., two wavefronts have the same amount of page-sharing with the wavefront assigned to the active subset in stage 420, the oldest wavefront involved in the tie is selected. The wavefront identified at stage 430 is assigned to the active subset, and the method 400 advances to stage 440.

In stage 440, it is determined whether to assign another wavefront from the set received at stage 410 to the active subset. In one case, this determination is made based on a predetermined maximum number of wavefronts that may be assigned to the active subset. In this case, the method 400 returns to stage 430 when the maximum number of wavefronts have not been assigned to the active subset; but proceeds to stage 450 when the maximum number of wavefronts have been assigned to the active subset.

In another case, the determination in stage 440 based on a predetermined number of unique active pages expected to be referenced by the wavefronts in the active subset. Information indicating unique active pages expected to be referenced by the wavefronts in the active subset may be gathered and provided by, e.g., the information mechanism 350 of FIG. 3. In the method 400 of FIG. 4, wavefronts from the set received in stage 410 that have not been assigned to the active subset are assigned to another subset in stage 450. In the two-level scheduling example depicted in FIG. 3, the remaining wavefronts are assigned to the pending subset.

Figure 5:
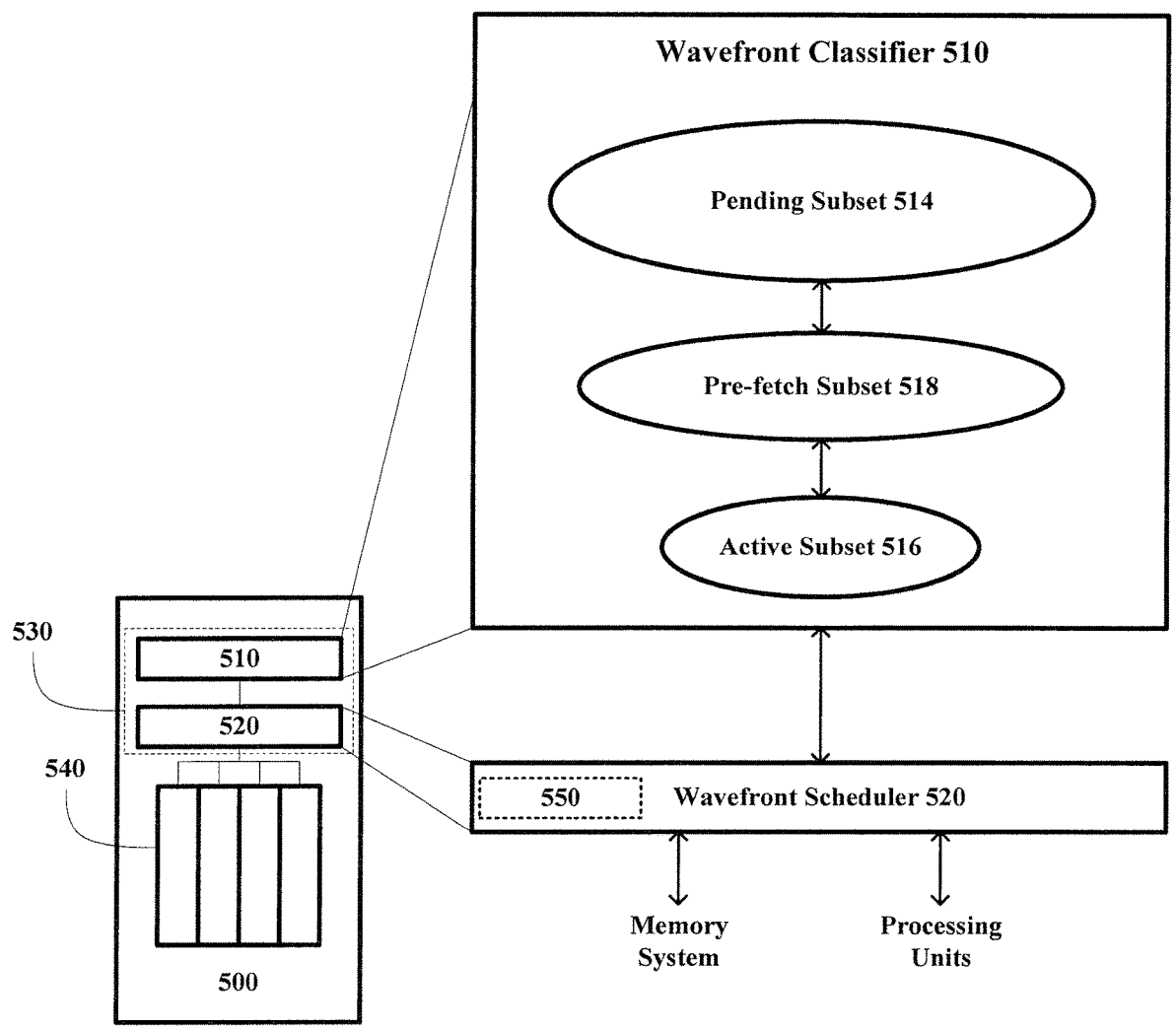
FIG. 5 illustrates an example processing unit that can classify a set of wavefronts into more than two subsets.

FIG. 5 illustrates an example processing unit 500 that can classify a set of wavefronts into more than two subsets. The processing unit 500 includes a wavefront scheduler 520, a plurality of processing lanes 540, and an information mechanism 550 similar to those described with respect to FIG. 3—thus a description of these elements will not be repeated here. Each of the processing units 1330a-1330d of FIG. 1 may be the same as or different than the processing unit 500 of FIG. 5. A person skilled in the art would understand that the processing unit 500 may include one or more components (e.g., implemented in hardware, software, or any combination of hardware and software) in addition to the components shown in the embodiment of FIG. 5 without departing from the scope of this disclosure.

Like the wavefront classifier 310 of FIG. 3, the wavefront classifier 510 of FIG. 5 may classify a set of wavefronts into subsets based on classification criteria, such as the classification criteria described above. In FIG. 5, the wavefront classifier 510 classifies a set of wavefronts received by the processing unit 500 into three subsets—a pending subset 514, an active subset 516, and a pre-fetch subset 518. In this three-level scheduling technique, wavefronts assigned to the active subset 516 are eligible to be scheduled by the scheduler 520 for processing through the processing lanes 540. Wavefronts assigned to the pre-fetch subset 318, and wavefronts assigned to the pre-fetch subset 518 are generally ineligible to be scheduled and processed; but, one or more wavefronts assigned to the pre-fetch subset 318 may become eligible if all wavefronts assigned to the active subset 518 become stalled, and one or more wavefronts assigned to the pending subset 514 may become eligible if wavefronts assigned to the active subset 516 and pre-fetch subset 518 become stalled.

In some embodiments, the active subset 516 includes a limited number of wavefronts eligible to be scheduled for processing, the pre-fetch subset 518 includes a limited number of wavefronts having outstanding address translation operation, and the pending subset 514 includes the remaining all remaining wavefronts. Wavefronts assigned to the pre-fetch subset 518 may be considered to be preparing for processing. Wavefronts in the pending subset 514 may be prevented from issuing memory instructions.

Figure 6:
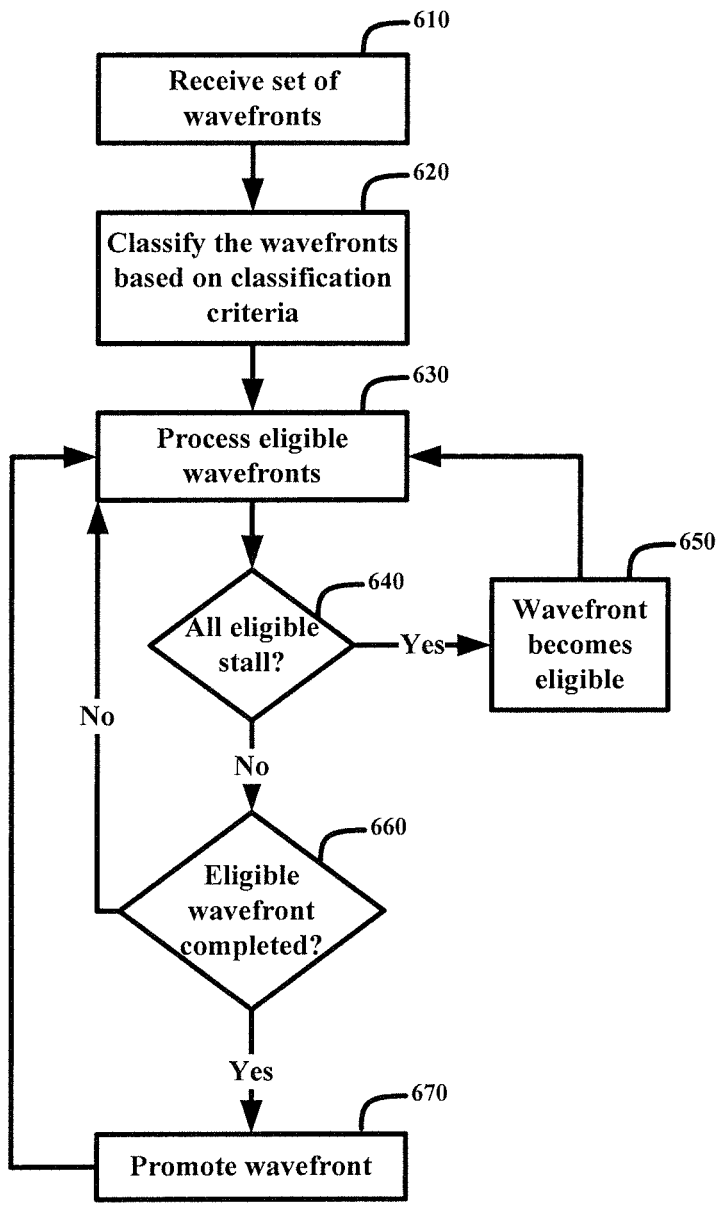
FIG. 6 illustrates an example method for processing wavefronts in a processing unit that may reduce address translation latency in a virtual memory system.

Turning now to FIG. 6, an example method 600 for processing wavefronts in a processing unit that may reduce address translation latency in a virtual memory system is illustrated. The method 600 may be implemented by the processing unit 300 of FIG. 3, which may be included in the GPU 130 of the system 100 of FIG. 1; but the method 600 is not limited thereto. The method 500 may be implemented by the processing unit 500 of FIG. 5, which may be included in the GPU 130 of FIG. 1; but the method 600 is not limited thereto. Additionally, each stage of the method 600 may represent a computer-readable instruction stored on a computer-readable storage device, which, when executed by a processor causes the processor to perform one or more operations.

The method 600 begins at stage 610, where a processing unit receives a set of wavefronts. Any number of wavefronts may be included in the set, e.g., plural, tens, hundreds, thousands, etc. In stage 620, the processing unit classifies the set of wavefronts into subsets based on classification criteria. Stage 620 may be implemented using a wavefront classifier, such as the wavefront classifier 310 of FIG. 3 or the wavefront classifier 510 of FIG. 5. And, stage 620 may implement two-level scheduling (where the set of wavefronts are classified into two subsets (e.g., an active subset and a pending subset)), three-level scheduling (where the set of wavefronts are classified into three subsets (e.g., an active subset, a pre-fetch subset, and a pending subset)), or n-level scheduling (where the set of wavefronts are classified into n subsets, n being a whole number greater than three). The maximum size of a subset may be limited or unlimited, and any two subsets may be the same size or different sizes. As in the discussion above, classification criteria may be based on, but is not limited to, an identifier associated with the set of wavefronts, information indicating page-usage affinity among wavefronts, or a combination of identifiers and information indicating page-usage affinity among wavefronts.

Once the set of wavefronts received in stage 610 and is classified into subsets in stage 620, the method 600 advances to stage 630. Here, the processing unit schedules and processes eligible wavefronts. As described above, the wavefronts assigned to the active subset are eligible to be scheduled and processed, and the wavefronts assigned to other subsets are generally ineligible. Stage 630 may be implemented using a wavefront scheduler (such as the wavefront scheduler 320 of FIG. 3 or the wavefront scheduler 520 of FIG. 5), and a plurality of processing lanes (such as the processing lanes 340 of FIG. 3 or the processing lanes 540 of FIG. 5).

In stage 640, it is determined whether all eligible wavefronts have stalled. In a two-level scheduling scheme, it may be determined whether all wavefronts assigned to an active subset have stalled. In a three-level scheduling scheme, it may be determined whether all wavefronts assigned to an active subset have stalled, or whether all wavefronts assigned to an active subset and a pre-fetch subset have stalled. A negative determination at stage 640 results in the method 600 advancing to stage 660; a positive determination results in the method 600 advancing to stage 650. Stage 640 may be implemented by a wavefront scheduler.

When the method 600 advances to stage 650, one or more wavefronts previously ineligible for scheduling and processing becomes eligible, e.g., assigned to an active subset. Additionally, one or more wavefronts assigned to an active subset that have stalled may be reassigned to a pre-fetch subset (e.g., to await results) or a pending subset. In a two-level scheduling scheme, a wavefront assigned to a pending subset may become eligible. In a three-level scheduling scheme, a wavefront assigned to a pre-fetch subset or a pending subset may become eligible. Selection of a wavefront to become eligible at stage 650 may be based on the classification criteria that was applied at stage 620, or may be random. Stage 650 may be implemented by a wavefront classifier. The method 600 returns to stage 630 upon completion of stage 650.

When the method 600 advances to stage 660, it is determined whether one or more eligible wavefronts have completed. As an example, it may be determined whether a wavefront assigned to an active subset has completed processing at stage 660. A negative determination at stage 660 results in the method 600 returning to stage 630. A positive determination at stage 660 results in the method 600 advancing to stage 670. Stage 660 may be implemented by a wavefront scheduler.

At stage 670, one or more wavefronts from a subset other than the active subset are promoted to the active subset, i.e., assigned to the active wavefront and become eligible to be scheduled an processed. In embodiments implementing two-level scheduling, one or more wavefronts from the pending subset may be assigned to the active subset. In embodiments implementing three-level scheduling, one or more wavefronts from the pre-fetch subset may be assigned to the active subset, and one or more wavefronts assigned to the pending subset may be assigned to the pre-fetch subset. Promotion of a wavefront may be based on the classification criteria that was applied at stage 620. Upon completion of stage 670, the method 600 returns to stage 630 where the eligible wavefronts are scheduled and processed. The method 600 repeats stages 630-670 until all wavefronts that were received at stage 610 are processed, and concludes thereafter.

Figure 7:
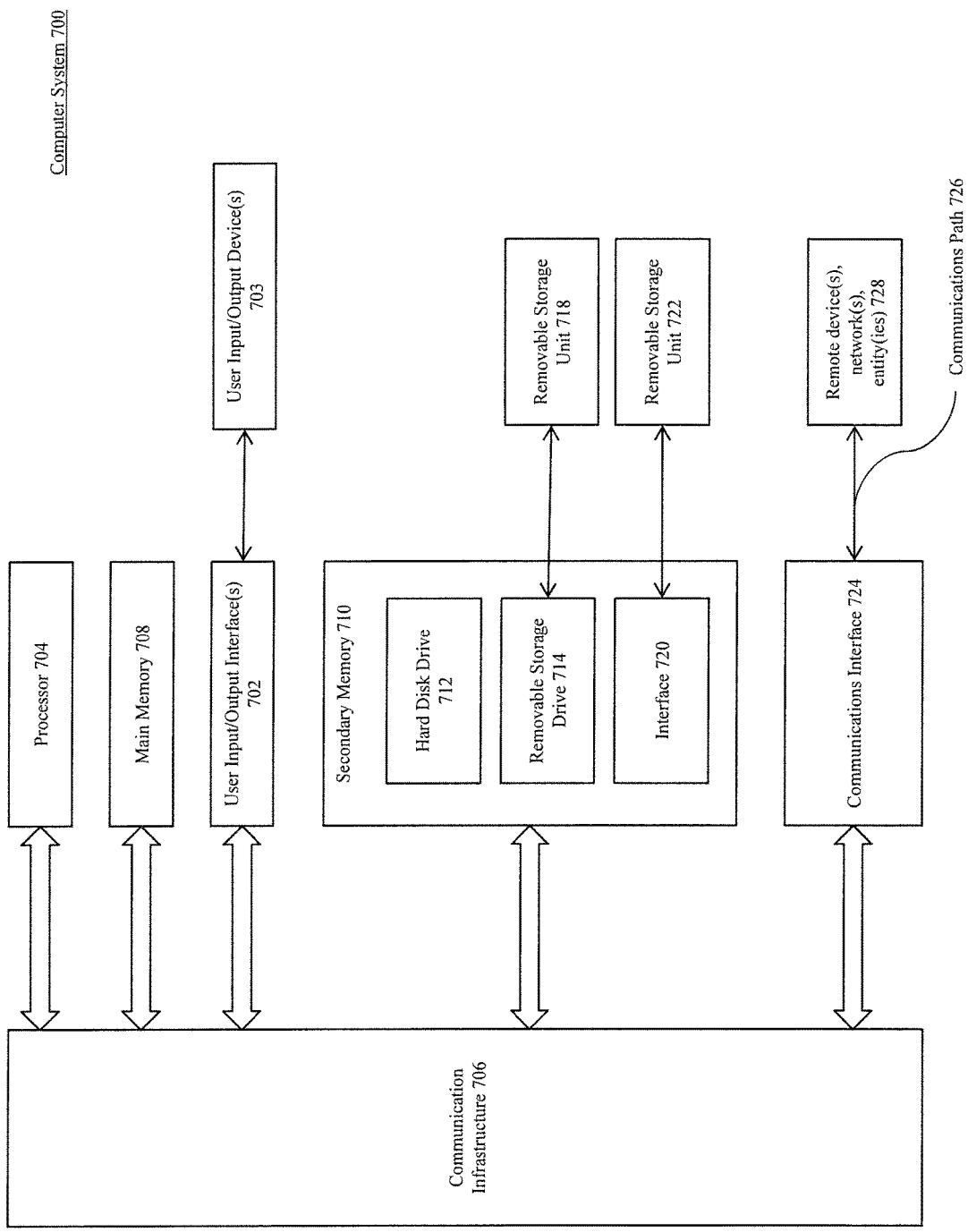
FIG. 7 illustrates an example computer system that may be useful for implementing various embodiments of the disclosure.

FIG. 7 illustrates an example computer system that may be useful for implementing various embodiments of the disclosure. Various embodiments can be implemented, for example, using one or more well-known computer systems, such as computer system 700 shown in FIG. 7. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 is connected to a communication infrastructure or bus 706. The controller 110 of FIG. 1 may be the same or different than processor 704.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos. GPU 130 of FIG. 1 may be a processor, such as processor 704. The GPU 130 of FIG. 1 may be the same or different than processor 704.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. The system memory 120 of FIG. 1 may include one or more of 710, 712, 714, 720, 718, or 722.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all example embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by one of ordinary skill in the art in light of the teachings and guidance.

The breadth and scope of the present disclosure should not be limited by any of the above-described example embodiments, but should be defined only in accordance with the following claims and their equivalents.

What is claimed is:

1. An accelerated processing device (APD) comprising:
   a cache;
   a memory management unit communicatively coupled to the cache; and
   a plurality of processors, wherein each of the plurality of processors is communicatively coupled to the memory management unit and includes a memory, a first application specific integrated circuit (ASIC), a second ASIC, and a plurality of processing lanes,
   wherein each first ASIC classifies a respective set of wavefronts into subsets by:
      assigning an oldest wavefront in the set of wavefronts to a subset that is eligible for scheduling,
      assigning at least one other wavefront with a highest degree of memory page sharing with the oldest wavefront to the subset that is eligible for scheduling, and
      assigning all other wavefronts in the subset to at least one other subset that is not eligible for scheduling,
   wherein each second ASIC schedules wavefronts assigned to the first subset that is eligible for scheduling for processing by the plurality of processing lanes of the respective processor.

2. The APD of claim 1, wherein each respective memory is configured to store a mapping of a virtual memory address to a physical memory address.

3. The APD of claim 1, wherein each of the plurality of processors is a single instruction, multiple data (SIMD) processing unit.

4. The APD of claim 1, wherein the subsets comprise an active subset and a pending subset, and each second ASIC is further configured to schedule the active subset for processing before scheduling the pending subset for processing.

5. The APD of claim 4, wherein the subsets further comprise a pre-fetch subset, and each second ASIC is further configured to schedule the pre-fetch subset for processing after scheduling the active subset for processing and before scheduling the pending subset for processing.

6. The APD of claim 1,
   wherein each of the plurality of processors is further configured to generate information indicating page-usage affinity between the wavefront and a second wavefront.

7. The APD of claim 6, wherein each of the plurality of processors is further configured to classify the wavefront into the subset based on the information indicating page-usage affinity between the wavefront and the second wavefront.

8. A method comprising:
   receiving, at each of a plurality of single instruction, multiple data (SIMD) processing units, a respective wavefront, wherein each of the plurality of SIMD processing units comprises a respective plurality of processing lanes;
   classifying, by each respective SIMD processing unit of the plurality of SIMD processing units, the respective wavefront into subsets by:
      assigning an oldest wavefront in the set of wavefronts to a subset that is eligible for scheduling,
      assigning at least one other wavefront with a highest degree of memory page sharing with the oldest wavefront to the subset that is eligible for scheduling, and
      assigning all other wavefronts in the subset to at least one other subset that is not eligible for scheduling; and
   scheduling, by each respective SIMD processing unit of the plurality of SIMD processing units, wavefronts assigned to the first subset that is eligible for scheduling for processing by a corresponding plurality of processing lanes.

9. The method of claim 8, wherein the subsets comprise an active subset and a pending subset.

10. The method of claim 9, wherein the subsets further comprise a pre-fetch subset.

11. The method of claim 9, further comprising:
    scheduling the active subset for processing before scheduling the pending subset for processing.

12. The method of claim 10, further comprising:
    scheduling the pre-fetch subset for processing after scheduling the active subset for processing and before scheduling the pending subset for processing.

13. A non-transitory computer readable storage device having computer readable instructions stored thereon, execution of which, by a graphics processing unit (GPU), causes the GPU to perform operations comprising:
    receiving, at each of a plurality of single instruction, multiple data (SIMD) processing units, a respective wavefront, wherein each of the plurality of SIMD processing units comprises a respective plurality of processing lanes;
    classifying, by each respective SIMD processing unit of the plurality of SIMD processing units, the respective wavefront into subsets by:
       assigning an oldest wavefront in the set of wavefronts to a subset that is eligible for scheduling,
       assigning at least one other wavefront with a highest degree of memory page sharing with the oldest wavefront to the subset that is eligible for scheduling, and assigning all other wavefronts in the subset to at least one other subset that is not eligible for scheduling; and scheduling, by each respective SIMD processing unit of the plurality of SIMD processing units, wavefronts assigned to the first subset that is eligible for scheduling for processing by a corresponding plurality of processing lanes.

14. The computer readable storage device of claim 13, wherein the subsets comprise an active subset and a pending subset.

15. The computer readable storage device of claim 14, wherein the subsets further comprise a pre-fetch subset.

16. The computer readable storage device of claim 14, the operations further comprising:
  scheduling the active subset for processing before scheduling the pending subset for processing.

17. The computer readable storage device of claim 15, the operations further comprising:
  scheduling the pre-fetch subset for processing after scheduling the active subset for processing and before scheduling the pending subset for processing.

\* \* \* \* \*